United States Patent

Schubert et al.

[11] Patent Number: 5,692,314
[45] Date of Patent: Dec. 2, 1997

[54] PROCESS FOR DRYING THE INSULATION OF STATOR WINDING RODS OF ELECTRICAL MACHINES WITH DIRECT LIQUID COOLING

[75] Inventors: Johann Schubert, Magenwil; Roland Schuler, Wettingen; Willibald Zerlik, Birr, all of Switzerland

[73] Assignee: Asea Brown Boveri AG, Baden, Switzerland

[21] Appl. No.: 679,242

[22] Filed: Jul. 12, 1996

[30] Foreign Application Priority Data

Jul. 12, 1995 [DE] Germany .................. 195 25 311.6

[51] Int. Cl.[6] .................................................. F26B 13/30
[52] U.S. Cl. ........................ 34/92; 34/405; 15/300.1
[58] Field of Search ................... 34/92, 405; 15/300.1, 15/406

[56] References Cited

U.S. PATENT DOCUMENTS 5,331,747  7/1994  Stanton ........................... 34/405

*Primary Examiner*—Henry Bennett
*Assistant Examiner*—D. Doster
*Attorney, Agent, or Firm*—Oblon, Spivak, McClelland, Maier & Neustadt, P.C.

[57] ABSTRACT

Winding rods, built into the stator of an electrical machine, are no longer safe to operate after leakages in a water chamber. After this waterchamber has been removed, as is necessary anyway, a flexible, gas-proof hose is pulled upon the rod end, and the machine-side end of the hose is attached to the rod in a gas-proof manner. The other hose end is connected to a vacuum pump and, by evacuating the hose, the water that has penetrated into the rod insulation is removed by the same route as it penetrated into the insulation.

The quality of this drying process is monitored by dielectric measurements.

2 Claims, 2 Drawing Sheets

5,692,314

PROCESS FOR DRYING THE INSULATION OF STATOR WINDING RODS OF ELECTRICAL MACHINES WITH DIRECT LIQUID COOLING

BACKGROUND OF THE INVENTION

1. Field of the Invention

This invention relates to a process for drying the insulation of stator winding rods of electrical machines with direct liquid cooling, which stator winding on both fronts of the machine comprises connection devices for power connection and for the supply or evacuation of cooling fluid or from the wave guides of the stator winding rods, at which connection device—and possibly in case of a stator winding that comprises not only wave guides but also massive subconductors—all subconductors are encompassed by a metallic structural component and are soldered together with the latter and among each other, which structural component protrudes over the subconductors, forming a water chamber, and which ends in a connection fitting for cooling liquid supply or cooling liquid evacuation.

2. Discussion of the Background

In the stator winding head of water-cooled electrical machines, the cooling fluid is supplied from ring-shaped collecting lines via insulation hoses to the so-called water chambers at the end of the conductor rod. The water chamber is formed by a connection device where the subconductors are encompassed by a metallic component and are soldered together with the latter and with each other. The metallic component protrudes over the subconductors, forming a water chamber. It ends in a connection fitting for cooling fluid supply or cooling fluid evacuation. The connection device at the same time serves as a power connection.

The connection device is exposed to high mechanical stresses (vibrations [oscillations]) during operation. Even minimal leakages cause damage to electrical machines. As a consequence, water penetrates into the winding insulation and, through hairline cracks between the conductor and the insulation, gets all the way into the iron part of the stator winding. When such damage occurs, then soldering connections must be renewed, if that is at all possible.

Before these new soldering connections are made, it is compellingly necessary to remove the water that has penetrated through the leaks into the insulation. Drying the winding—such as this is done in new machines, for example, by downtime heating—is out of the question here because, during the drying process, the escaping water/water vapor cannot be completely removed from the winding via the same route by which it penetrated; instead, detailed investigations document the danger that the penetrated water will spread even more deeply in the winding.

SUMMARY OF THE INVENTION

The object of the invention is to provide a process for drying the stator winding [coil] of the kind mentioned initially, that can be implemented in a simple manner without removal or even replacement of the stator winding but that facilitates extensive removal of the water that has penetrated.

This problem is solved according to the invention in that, after the removal of one or both connection devices of a rod, the now exposed wave guides are temporarily closed, that a flexible, gas-proof hose is pushed over the rod end or ends, where the machine-side end of the hose is attached to the rod in a gas-proof manner, where the free hose end is connected to the suction connection of a vacuum pump, and where, by evacuating the hose, the water that has penetrated into the insulation of the conductor rod is removed; the criterion for the degree of drying achieved consists of dielectric measurements, especially recording of the insulation resistance between the conductor and the iron unit, the loss factor measurement, or capacity measurements.

Using the process according to the invention, one can dry stator winding rods in the built-in state and thus make them safe again to operate. The invention will be described in greater detail below with the help of an exemplary embodiment illustrated in the drawing.

BRIEF DESCRIPTION OF DRAWING

The drawing illustrates the exemplary embodiments of the invention in a schematic manner; specifically.

DISCUSSION OF THE PREFERRED EMBODIMENTS

Figure 1:
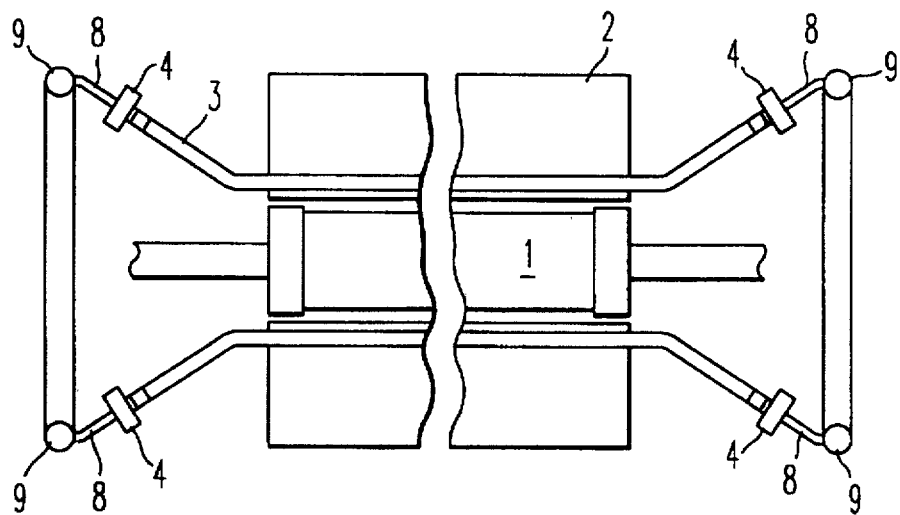
FIG. 1 is a greatly simplified longitudinal profile through a turbogenerator with a directly water-cooled stator winding.

The initial object of the drying process described below is a turbogenerator with a directly water-cooled stator winding, as illustrated in a simplified manner in FIG. 1.

Figure 2:
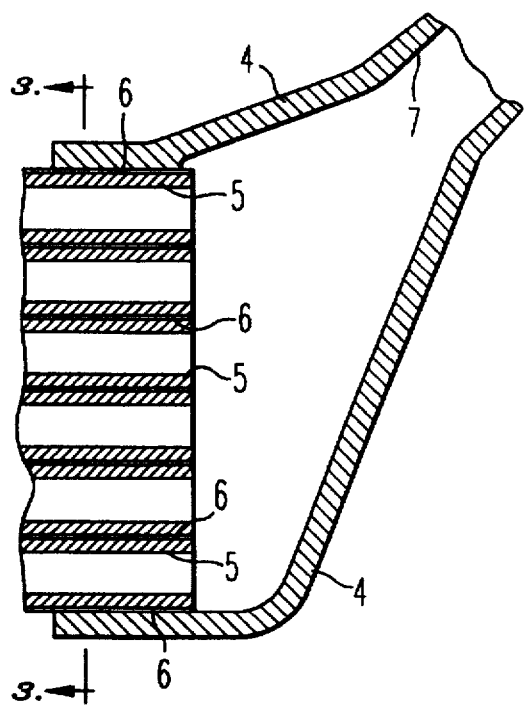
FIG. 2 is a longitudinal profile through a water chamber of the generator according to FIG. 1.
Figure 3:
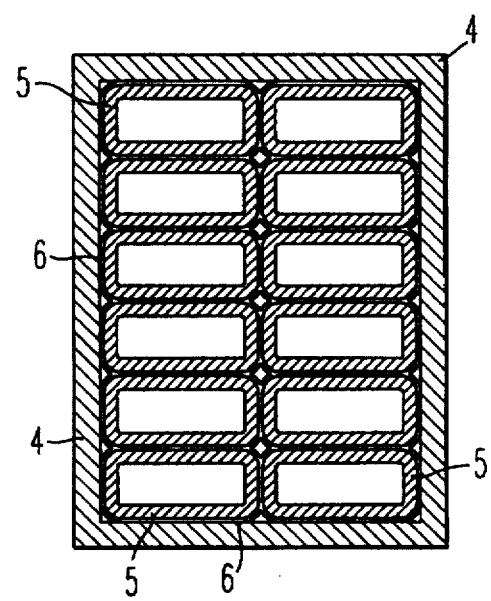
FIG. 3 is a lateral profile through the water chamber according to FIG. 2 along its line AA.
Figure 4:
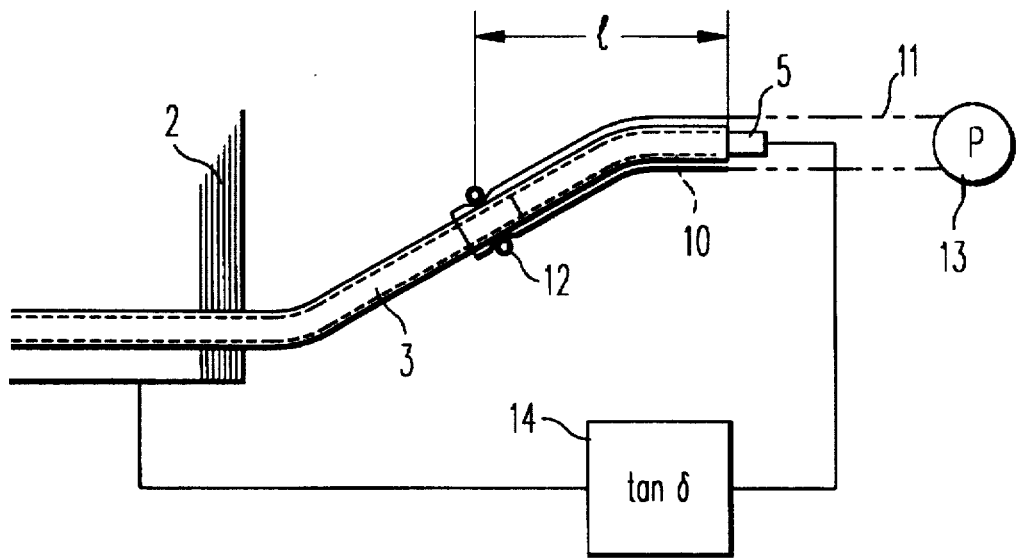
FIG. 4 is a simplified longitudinal profile of the end of the turbogenerator according to FIG. 1 where the water chamber has been removed and where a drying device is applied.
Figure 5:
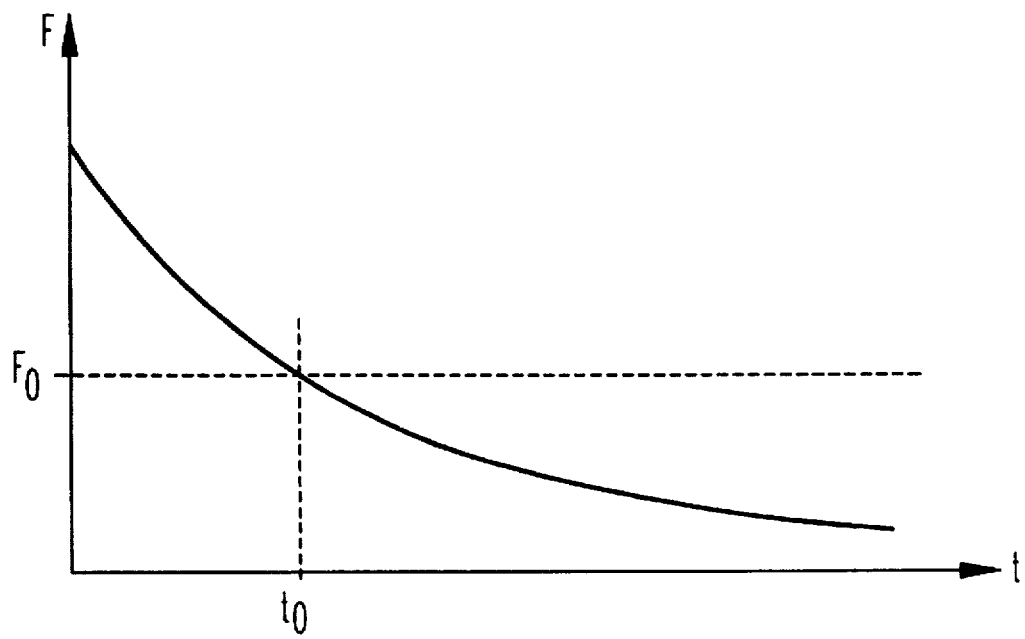
FIG. 5 shows a diagram to qualify the process according to the invention.

The turbogenerator has a rotor 1, a stator with a sheet metal stator body 2 with a stator winding 3. The winding ends of the stator winding are provided in the known manner with water chambers 4 for the electrical and hydraulic connection of the subconductors 5 whose structure is shown in FIGS. 2 and 3.

Water chamber 4 is a single-part or multipart metallic component that surrounds the subconductors 5, which are combined into a cluster. Subconductors 5 are connected with each other and with the water chamber 4 by means of hard soldering. The solder layers are marked with the reference number 6 in FIGS. 2 and 3.

The free end of the water chamber is tapered and is transformed into a connecting fitting 7 (merely indicated). Connected to the fitting are insulation hoses 8 that connect the interior of all water chambers with ring lines 9 on both machine ends. Cooling water is supplied to or evacuated again from subconductors 5 through these lines. In FIGS. 2 and 3, the stator winding is made up exclusively of subconductors 5. The basic structure remains the same in stator windings that have massive subconductors also in addition to wave guides.

On the basis of the heavy stresses to which the winding heads of electrical machines are exposed, it happens again and again that the soldering connections on or in the water chamber are damaged locally. This causes leakages in the cooling system. Particularly dangerous are soldering points that have become defective when the cooling water, which is under pressure, penetrates from water chamber 5 in the stator winding in the direction toward the interior of the machine and when it spreads via hairline cracks between the surface of the subconductors and the main insulation 10 or between neighboring subconductors 5. Such winding rods are no longer safe to operate because the water has penetrated; this can be recorded, for example, during customary dielectric measurements, and the rods would really have to be exchanged.

This is where the invention comes in by providing a simple process that smoothly fits into the repair process for the purpose of drying the stator winding without having to take it out.

In case of leakages in or on water chamber 4, the latter must be removed anyway and must be replaced with a new one; this is why the invention provides closing the now exposed subconductors 5 temporarily on both rod ends. Then a flexible, gas-proof hose 11 is pushed over the rod end. In the process, the length of the overlap 1 is selected as large as possible, specifically at least 80 cm. The machine-side end of hose 11 is attached to the rod in a gas-proof manner, for example, by means of a hose clip 12. The free hose end is connected to the suction connection of a vacuum pump 13. By evacuating hose 11 to values of around 0.1 mm Hg, the water that has penetrated into insulation 10 of conductor rod 3 is thus removed. The criterion for the degree of drying achieved is provided by dielectric measurements, especially recording of the insulation resistance between the conductor and the iron body, capacity measurements or loss factor measurement, with the usual diagnosis unit 14, such as it is also used for field measurements. The diagnosis unit 14 is therefore connected between subconductor 5 and the stator body that is on ground potential.

During evacuation, one constantly records the moisture content F of the stator winding that is determined indirectly by one of the above-mentioned parameters. The drawing process can be suspended if one falls short of an empirical value $F_o$ that appears after a certain evacuation time $t_o$.

The evacuation is performed only on one machine side in the process described. To ensure that there will be a sufficiently high vacuum inside the insulation, it may be required to attach either hoses 11 on both rod ends and to evacuate on both sides, in other words, to dry simultaneously from both sides, or the other rod end is sealed by a flexible, gas-proof hose that is pushed over the rod and that protrudes beyond it.

The procedure described is repeated for all stator winding rods where dielectric measurements or other observations revealed increased moisture content. Only then are new water chambers attached.

We claim:

1. Process for drying the insulation of stator winding rods in electrical machines with direct water cooling, which stator winding rods on both sides of the machine have connection devices for power connection and for the supply or evacuation of cooling liquid to or from subconductors of the stator winding rods, in which connection device all subconductors are encompassed by a metallic component and are soldered together with the connection device and with other subconductors, said metallic component protrudes beyond the subconductors, forming a wafer chamber, and ends in a connecting fitting for cooling water supply or cooling water evacuation, characterized in that, after removal of one or both connection devices of a rod, the now exposed subconductors are temporarily closed, where a flexible, gas-proof hose is pushed over the rod end or ends, where the machine-side end of the hose is attached to the rod in a gas-proof manner, where the free hose end is connected to the suction connection of a vacuum pump (13), and where, by means of evacuation of the hose (11), the water that has penetrated into insulation of tho conductor rod is removed, where the criterion for the degree of drying achieved consists of dielectric measurements, by recording of the insulation resistance between the conductor and the iron body, loss factor measurement or capacity measurements.

2. Process according to claim 1, characterized in that evacuation is performed only on one machine side while a gas-proof hose is pulled over front shackles of the rod at another machine side.

\* \* \* \* \*